(12) United States Patent
Sung et al.

(10) Patent No.: US 8,878,732 B1
(45) Date of Patent: *Nov. 4, 2014

(54) ANTENNA DEVICE OF MOBILE TERMINAL

(71) Applicant: Samsung Electronics Co., Ltd., Gyeonggi-do (KR)

(72) Inventors: Sang Bong Sung, Gyeongsangbuk-do (KR); In Jin Hwang, Gyeongsangbuk-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/464,451

(22) Filed: Aug. 20, 2014

Related U.S. Application Data

(63) Continuation of application No. 13/962,483, filed on Aug. 8, 2013, which is a continuation of application No. 13/458,453, filed on Apr. 27, 2012, now Pat. No. 8,531,342, which is a continuation of application No. 12/489,044, filed on Jun. 22, 2009, now Pat. No. 8,188,930.

(30) Foreign Application Priority Data

Jun. 20, 2008 (KR) .................. 10-2008-0058619

(51) Int. Cl.
*H01Q 1/24* (2006.01)
*H01Q 1/48* (2006.01)

(52) U.S. Cl.
CPC . *H01Q 1/243* (2013.01); *H01Q 1/48* (2013.01)

USPC ............................................. 343/702; 343/846

(58) Field of Classification Search
CPC ........ H01Q 1/243; H01Q 1/38; H01Q 9/0421
USPC .................. 343/702, 846, 700 MS, 848
See application file for complete search history.

(56) References Cited

U.S. PATENT DOCUMENTS

| | | | |
|---|---|---|---|
| 6,028,555 | A | 2/2000 | Harano |
| 6,446,931 | B1 | 9/2002 | Hayashi |
| 6,940,460 | B2 | 9/2005 | Maoz et al. |
| 7,746,280 | B2 | 6/2010 | Kim et al. |
| 7,764,246 | B2 | 7/2010 | Yu et al. |
| 7,801,577 | B2 | 9/2010 | Lee |

(Continued)

FOREIGN PATENT DOCUMENTS

| | | |
|---|---|---|
| KR | 1020060022485 | 3/2006 |
| KR | 1020060062969 | 6/2006 |
| KR | 1020070122101 | 12/2007 |
| KR | 1020080008687 | 1/2008 |

*Primary Examiner* — Hoanganh Le
(74) *Attorney, Agent, or Firm* — The Farrell Law Firm, P.C.

(57) ABSTRACT

Various mobile communication terminals and methods having antenna improvements are discussed. One mobile communication terminal is described which includes an outer front side with a display, an outer rear side having conductive and non-conductive parts, a battery, and an antenna including a radiation unit, part of which is located between the outer front side and the non-conductive part of the outer rear side, a feeding unit which electrically connects the radiation unit to a circuit board, and a ground part which is connected to the conductive part of the outer rear side, electrically connects the radiation unit to the conductive part of the outer rear side, and is separated from the feeding unit by a space.

30 Claims, 7 Drawing Sheets

(56) References Cited

U.S. PATENT DOCUMENTS

| | | |
|---|---|---|
| 7,903,043 B2 | 3/2011 | Rawat et al. |
| 8,188,930 B2 | 5/2012 | Sung et al. |
| 8,810,459 B2 * | 8/2014 | Sung et al. ............ 343/702 |
| 2004/0027295 A1 | 2/2004 | Huber et al. |
| 2004/0147297 A1 | 7/2004 | Mikkola et al. |
| 2005/0275594 A1 | 12/2005 | Zhang et al. |
| 2007/0152894 A1 | 7/2007 | Sanz et al. |
| 2007/0194997 A1 | 8/2007 | Nakanishi et al. |
| 2008/0169986 A1 | 7/2008 | Cheng et al. |
| 2008/0316116 A1 | 12/2008 | Hobson et al. |
| 2009/0058735 A1 | 3/2009 | Hill et al. |
| 2009/0140942 A1 | 6/2009 | Mikkola et al. |
| 2009/0174612 A1 | 7/2009 | Ayala et al. |
| 2011/0193752 A1 | 8/2011 | Wang et al. |
| 2012/0212378 A1 | 8/2012 | Sung et al. |

* cited by examiner

ANTENNA DEVICE OF MOBILE TERMINAL

PRIORITY

This application is a continuation of, and thereby claims priority under 35 U.S.C. §120 to, U.S. patent application Ser. No. 13/962,483, filed on Aug. 8, 2013, which is a continuation of U.S. Pat. No. 8,531,342, filed Apr. 27, 2012, which is continuation of U.S. Pat. No. 8,188,930, filed Jun. 22, 2009, which claims priority under 35 U.S.C. §119(a) to Korean Patent Application No. 10-2008-0058619 filed in the Korean Intellectual Property Office on Jun. 20, 2008, the contents of all of which are incorporated herein by reference.

BACKGROUND OF THE INVENTION

1. Field of the Invention

The present invention relates generally to an antenna device, and more particularly, to an antenna device of a mobile terminal that can change a monopole type antenna to a Planar Inverted-F Antenna (PIFA) by grounding one side of the monopole type antenna to a battery cover composed of a metal material in order to secure radiation performance of the mobile terminal when the battery cover composed of a metal material is fixed to the mobile terminal.

2. Description of the Related Art

In accordance with user demand, mobile terminals have decreased size and thickness and provide various functions according to a digital convergence trend. For example, mobile terminals provide a service using a communication function such as digital broadcasting reception, Global Positioning System (GPS), Bluetooth, Radio Frequency Identification (RFID), and mobile commerce. The mobile terminal providing the communication function has one or more antennas. The antenna efficiently transmits or receives a signal in order to perform wireless communication.

Since mobile terminals have decreased in size and thickness, housings of the mobile terminals have reduced in strength. In order to solve the strength problem of the mobile terminal housing, the mobile terminal housing is composed of a metal material. However, the mobile terminal housing composed of a metal material adversely affects radiation performance of the antenna. Particularly, when a battery cover composed of a metal material is positioned adjacent to the antenna, a parasitic resonance occurs, whereby radiation performance of the antenna deteriorates. Therefore, when using a mobile terminal housing composed of a metal material, an antenna device in which radiation performance of the mobile terminal does not deteriorate is desirable.

SUMMARY OF THE INVENTION

Embodiments of the present invention address at least the above problems and/or disadvantages and to provide at least the advantages described below. Accordingly, one aspect of the present invention provides a mobile communication terminal having an antenna device that can secure radiation performance.

According to one aspect of the present invention, a mobile communication terminal includes an outer front side having a display disposed therein; an outer rear side including a conductive part and a non-conductive part; a battery disposed between the outer front side and the outer rear side; and an antenna including a radiation unit capable of receiving a signal, at least a portion of the radiation unit being disposed between the outer front side and the non-conductive part of the outer rear side, a feeding unit which electrically connects the radiation unit to a circuit board, and a ground part which is connected to the conductive part of the outer rear side, electrically connects the radiation unit to the conductive part of the outer rear side, and is separated from the feeding unit by a space.

According to another aspect of the present invention, a mobile communication terminal includes an outer front side having a display disposed therein; an outer rear side including a metallic part and a non-metallic part; and a battery disposed between the outer front side and the outer rear side; and an Inverted-F Antenna (IFA) including a radiation unit capable of receiving a signal, at least a portion of the radiation unit being disposed between the outer front side and the non-metallic part of the outer rear side, a feeding unit which electrically connects the radiation unit to a circuit board, a ground part which electrically connects the radiation unit to the metallic part of the outer rear side, and an extended ground part formed by the metallic part of the outer rear side.

According to yet another aspect of the present invention, a mobile communication terminal including an outer front side having a display disposed therein; an outer rear side including a conductive part and a non-conductive part; a battery disposed between the outer front side and the outer rear side; and an antenna including a radiation unit capable of receiving a signal, at least a portion of the radiation unit being disposed between the outer front side and the non-conductive part of the outer rear side, a feeding unit which passes an electrical signal between the radiation unit and a circuit board, and a ground part which is coupled to the conductive part of the outer rear side, electrically connects the radiation unit to the conductive part of the outer rear side, and is separated from the feeding unit by a space.

According to still another aspect of the present invention, a mobile communication terminal including an outer front side having a display disposed therein; an outer rear side including a conductive part and a non-conductive part; a battery disposed between the outer front side and the outer rear side; and an antenna including a radiation unit capable of receiving a signal, at least a portion of the radiation unit being disposed under the non-conductive part of the outer rear side, a feeding unit which electrically connects the radiation unit to a circuit board, and a ground part which is coupled to the conductive part of the outer rear side, electrically connects the radiation unit to the conductive part of the outer rear side, and is separated from the feeding unit by a space.

BRIEF DESCRIPTION OF THE DRAWINGS

The above and other aspects, features and advantages of the present invention will be more apparent from the following detailed description when taken in conjunction with the accompanying drawings in which.

DETAILED DESCRIPTION OF EMBODIMENTS OF THE PRESENT INVENTION

Figure 1:
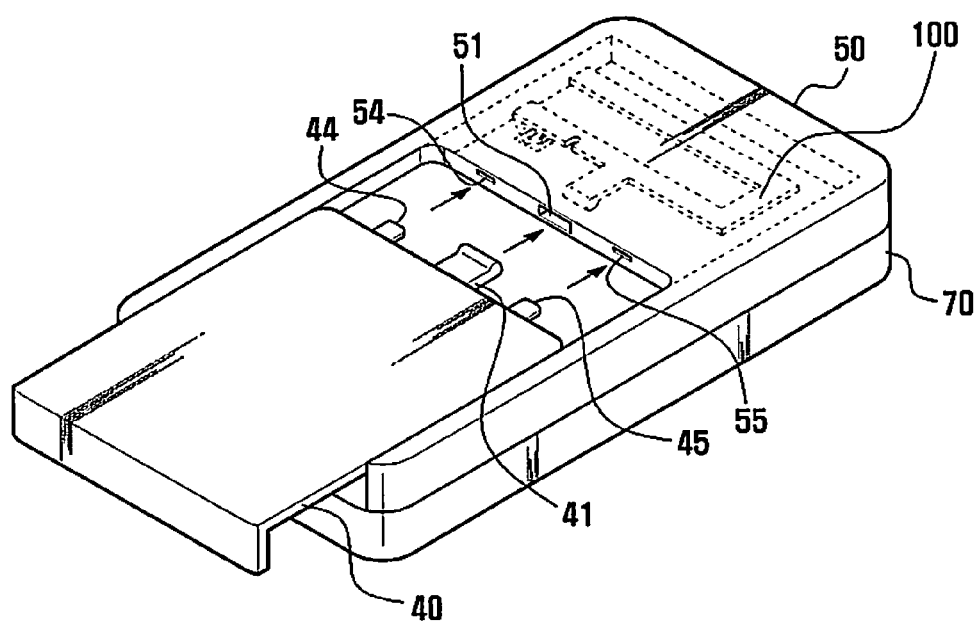
FIG. 1 is a diagram illustrating a perspective view of a rear surface of a mobile terminal, according to an embodiment of the present invention.

Embodiments of the present invention are described in detail with reference to the accompanying drawings. The same or similar components are designated by the same or similar reference numerals although they are illustrated in different drawings. The views in the drawings are schematic views only, and are not intended to be to scale or correctly proportioned.

Detailed descriptions of constructions or processes known in the art may be omitted to avoid obscuring the subject matter of the present invention.

In the following description, a mobile terminal according to the present invention includes a battery cover composed of a metal material and an antenna, and may be an information and communication device or a multimedia device such as a mobile communication terminal, mobile phone, Personal Digital Assistant (PDA), smart phone, International Mobile Telecommunication 2000 (IMT-2000) terminal, Code Division Multiple Access (CDMA) terminal, Global System for Mobile Communication (GSM) terminal, Universal Mobile Telecommunication Service (UMTS) terminal, digital broadcasting terminal, and applications thereof.

Hereinafter, "radiation performance" is a transmission and reception ability of an antenna device, i.e. an ability to enable the antenna device to receive a signal transmitted by other terminals with minimum damage to the signal and to transmit a signal to other terminals with minimum damage to the signal.

A "monopole antenna" is an antenna having one grounded side, unlike a dipole antenna, which uses both poles. Because a grounded portion generates an image effect, the monopole antenna has the same effect as that of a dipole antenna. In a mobile terminal, because the monopole antenna uses the ground of the mobile terminal, the monopole antenna has a reduced length compared to the dipole antenna.

A "planar inverted-F antenna (PTA)" is an antenna having an inverted F-shape including a PCB, radiator, feeding unit, and ground unit.

FIG. 1 is a diagram illustrating a perspective view of a rear surface of a mobile terminal, according to an embodiment of the present invention.

Referring to FIG. 1, a mobile terminal according to the present embodiment includes an upper body 70 having a display unit and a lower body 50 for inserting a battery. The mobile terminal is a bar type mobile terminal in which an antenna device 100 is mounted in the lower body 50. However a mobile terminal according to the present invention is not limited thereto and may be a mobile terminal of various other types, such as a folder type and a slide type.

The lower body 50 has a space for inserting a battery, and a battery cover 40 is fastened to the mobile terminal to prevent the battery from being separated from the mobile terminal.

The lower body 50 has grooves 51, 54, and 55 at an upper end of an opened region in order to securely fasten the battery cover 40.

The battery cover 40 has a rectangular shape and has a protrusion part 41 and first auxiliary protrusion parts 44 and 45 corresponding to the grooves 51, 54, and 55, respectively, of the lower body 50 at a first side thereof. When the battery cover 40 is fastened to the lower body 50, the antenna device 100 contacts the protrusion part 41.

Figure 2A:
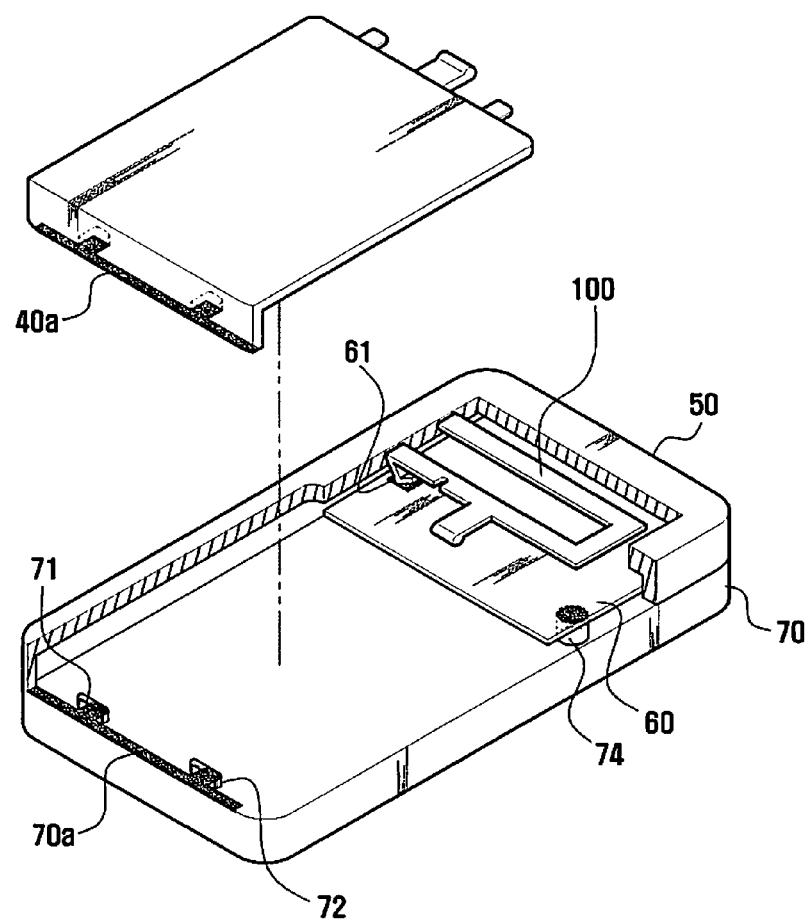
FIG. 2A is a diagram illustrating a partially cut away perspective view of the rear surface of the mobile terminal of FIG. 1.
Figure 2B:
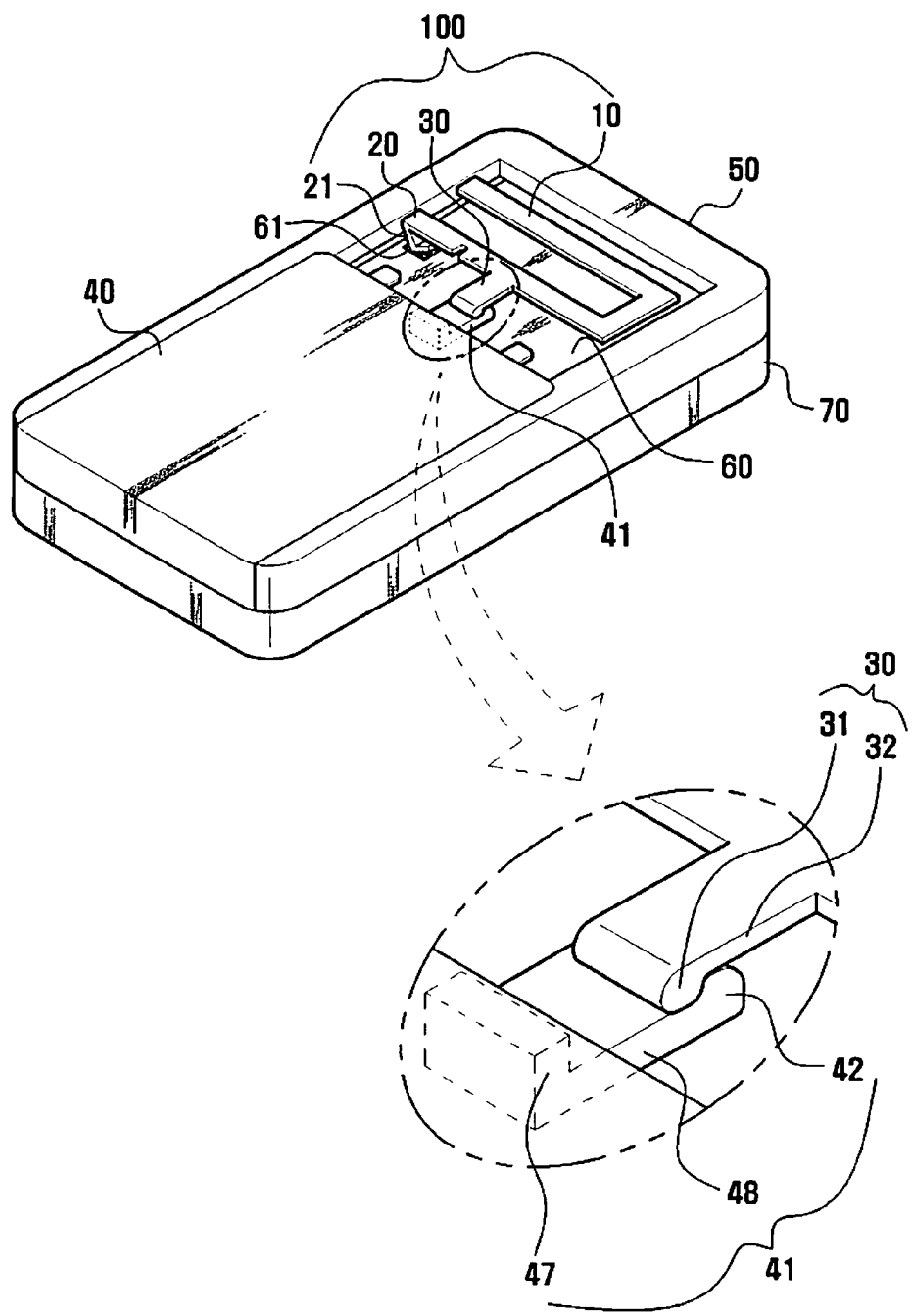
FIG. 2B is a diagram illustrating a perspective view of a fastened state of an antenna device and a battery cover in the rear surface of the mobile terminal of FIG. 1.

FIG. 2A is a diagram illustrating a partially cut away perspective view of the rear surface of the mobile terminal of FIG. 1. FIG. 2B is a perspective view illustrating a fastened state of the antenna device 100 and the battery cover 40 in the rear surface of the mobile terminal of FIG. 1.

Referring to FIGS. 1 to 2B, the mobile terminal includes the battery cover 40, the lower body 50, a PCB 60, the upper body 70, and the antenna device 100.

The PCB 60 is a thin plate for mounting electronic parts and elements for use in the mobile terminal, such as an Integrated Circuit (IC), resistor, capacitor, and switch, and includes wiring circuits for electrically connecting the mounted electronic parts and elements. Particularly, the PCB 60, according to the present embodiment, is mounted in the upper body 70 and includes an antenna contact part 61 formed at a side portion of a surface facing towards the battery cover 40.

The antenna contact part 61 is an electrical contact for supplying an electric signal to the antenna device 100 and has a rectangular shape. However a shape of the antenna contact part 61 is not limited thereto and the antenna contact part 61 can have various shapes, such as a circle and a rhombus.

The antenna device 100 is mounted at an inner part of the lower body 50, and is positioned between the PCB 60 and the lower body 50. The antenna device 100 is electrically connected to the antenna contact part 61. Further, when the battery cover 40 is fastened to the lower body 50, the antenna device 100 contacts the battery cover 40. For this, the antenna device 100 includes a feeding unit 20 connected to the antenna contact part 61, a ground part 30 connected to the battery cover 40, and a radiation unit 10 for transmitting and receiving a signal. Further, the antenna device 100 has a groove for fixing the antenna device 100 to the lower body 50. The antenna device 100 is described in detail below.

The lower body 50 is an external housing of the mobile terminal, and a battery is mounted in the lower body 50. Particularly, the lower body 50, according to the present embodiment, mounts the antenna device 100 at an inner part thereof. It is preferable that the lower body 50 is made of a nonmetal material in order for the antenna device 100 to enable efficient radiation of a signal.

The upper body 70 is an external housing of the mobile terminal in which the PCB 60 including electronic parts is mounted, and is coupled to the lower body 50. The upper body 70 has fastening parts 71 and 72 for inserting and fixing second auxiliary protrusion parts 43 and 46 (shown in FIG. 3B) of the battery cover 40. Particularly, at least part of the upper body 70, according to the present embodiment, is composed of a metal material, for example, Steel Use Stainless (SUS). Further, the upper body 70 is connected at one side to the ground of the PCB 60. A support 74 is formed at one side of the upper body 70, for example, at a surface opposite to the PCB 60, as shown in FIG. 2A, so that the PCB 60 securely contacts the ground.

The battery cover 40 has a rectangular shape and has the protrusion part 41 for contacting with the ground part 30 of the antenna device 100, and the first auxiliary protrusion parts 44 and 45 and second auxiliary protrusion parts 43 and 46 for preventing the battery cover 40 from being separated from the mobile terminal. Particularly, the battery cover 40, according to the present embodiment, is composed of a metal material, for example, SUS. When the battery cover 40 is fastened to the lower body 50, the protrusion part 41 is fastened to the ground part 30. Specifically, referring to the enlarged portion of FIG. 2B, the ground part 30 has a first extension part 32 extending from a side of the radiation unit 10 and perpendicular thereto, and has a first projection 31 formed at a lower surface of an end portion of the first extension part 32. The protrusion part 41 has a second extension part 47 formed at a lower surface of the battery cover 40 at a predetermined distance from an outer edge thereof. A third extension part 48 is formed at an outer end of the second extension part 47 and extends parallel to the battery cover 40 in a direction away from the outer edge of the battery cover 40 to project at a predetermined distance therefrom. A second projection 42 is formed at an upper surface of an end portion of the third extension part 48.

When the protrusion part 41 and the ground part 30 are fastened, the first extension part 32 and the third extension part 48 are disposed parallel, the first projection 31 is positioned between the second projection 42 and the second extension part 47, and the second projection 42 is positioned between the first projection 31 and the radiation unit 10. When the battery cover 40 is attached to the lower body 50, the first projection 31 and the second projection 42 are disposed in a line in the direction of movement at attachment, and can only be separated by a force greater than a predetermined force. It is preferable that the first projection 31 and the second projection 42 are formed having a circular cross-sectional form (for example, a half-circle).

However, a form of the first projection 31 and the second projection 42 are not limited thereto. Accordingly, the ground part 30 and the protrusion part 41 can be fastened in various forms according to a designer's intention.

When the battery cover 40 is fastened to the lower body 50, the feeding unit 20 is electrically connected to the antenna contact part 61 included in the PCB 60, the ground part 30 contacts the protrusion part 41 of the battery cover 40, and thereby the antenna device 100 operates as a PIFA. The battery cover 40 performs a function as the ground of the antenna device 100 as an element of the antenna device 100, instead of acting as a separate element that adversely affects radiation performance of the antenna device 100. Further, the battery cover 40 contacts the upper body 70 to extend the ground of the antenna device 100. Specifically, when the battery cover 40 is fastened to the lower body 50, the battery cover 40 contacts a side surface of the upper body 70, specifically at regions 70a and 40a (as shown shaded in FIG. 2A). It is preferable that the upper body 70 is composed of a metal material. Further, as described above, as the upper body 70 contacts the ground of the PCB 60, the battery cover 40, the upper body 70, and the ground of the PCB 60 are connected to form one ground.

When the battery cover 40 is not fastened to the lower body 50, the antenna device 100 operates as a monopole antenna in which only the feeding unit 20 is electrically connected to the antenna contact part 61.

In FIGS. 1 to 2B, the antenna device 100 is positioned at an upper end of the mobile terminal and the battery cover 40 is fastened to a lower end thereof, however the present invention is not limited thereto. For example, embodiments according to the present invention may have a structure in which the antenna device 100 is positioned at a lower end of the mobile terminal and the battery cover 40 is fastened to an upper end thereof.

Figure 3A:
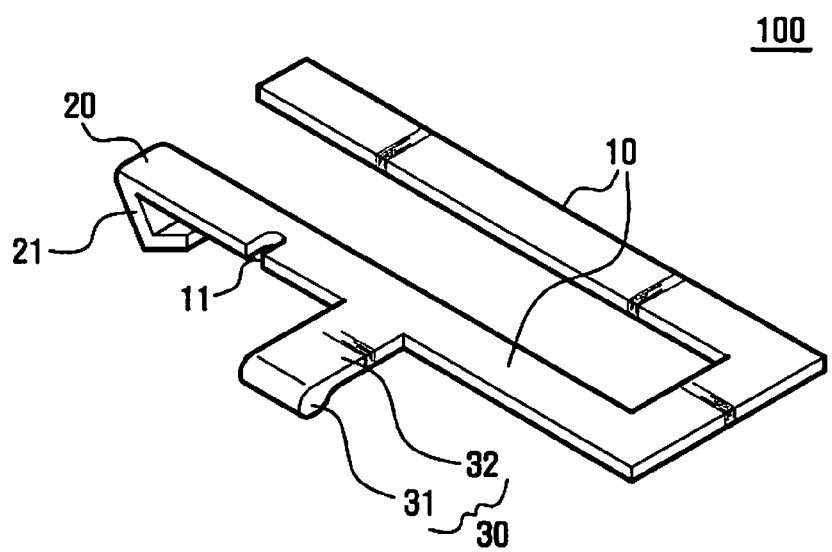
FIG. 3A is a diagram illustrating a perspective view of the antenna device of the mobile terminal of FIG. 2B.

FIG. 3A is a diagram illustrating a perspective view of the antenna device 100 in more detail.

Referring to FIGS. 1 to 3A, the antenna device 100 includes the radiation unit 10, and the feeding unit 20 formed at an end portion of one side of the radiation unit 10 to electrically connect the PCB 60 and the radiation unit 10. The antenna device 100 also includes the ground part 30 disposed a predetermined distance from the feeding unit 20 and formed at one side of the radiation unit 10.

The radiation unit 10 is a metal plate (for example, a copper or nickel silver plate) having a predetermined width and thickness and having a predetermined shape such as a "⊂"-shape. At one side of the radiation unit 10, the feeding unit 20, for connecting the PCB 60 and the radiation unit 10, and the ground part 30, for connecting the battery cover 40 and the radiation unit 10, are formed. The radiation unit 10 has a predetermined length according to a wavelength λ of a using frequency f. The radiation unit 10 generally has a length λ/4.

The radiation unit 10 has one or more grooves 11 for preventing the antenna device 100 from moving. The groove 11 may be formed as a hole. A shape of the radiation unit 10 is not limited to the "⊂"-shape. That is, the radiation unit 10 can take various forms such as a linear shape, "⊐"-shape, and a zigzag shape according to a design of a mobile terminal, a designer's intention, and radiation performance.

The feeding unit 20 is positioned at an end portion of one side of the radiation unit 10 so as to connect the PCB 60 and the radiation unit 10, thereby functioning as a passage for supplying an electrical signal to the radiation unit 10. The feeding unit 20 includes a connection member for electrically connecting the radiation unit 10 to the PCB 60. For example, the connection member may be a clip 21 having a "C"-shape (hereinafter, C-clip). The C-clip 21 is integrally formed with the feeding unit 20 and preferably has elasticity so as to sustain a contact with the PCB 60. However, the C-clip 21 of other embodiments of the present invention are not limited thereto. For example, the C-clip 21 may be mounted in the antenna contact part 61 of the PCB 60.

The ground part 30 is disposed a predetermined distance from the feeding unit 20 and formed at one side of the radiation unit 10. When the battery cover 40 is fastened to the lower body 50, the ground part 30 contacts the protrusion part 41 of the battery cover 40. The ground part 30 sustains a contact with the battery cover 40 through the first projection 31 for preventing separation from the battery cover 40. A form of the first projection 31 is not limited to that shown in FIG. 3A, and may take various forms according to a fastened structure. For example, the first projection 31 may take a nipper form that grips the battery cover 40.

The antenna device 100 has a varying resonance frequency according to a distance between the feeding unit 20 and the ground part 30, and the length and width of the ground part 30. An optimized value of the distance between the feeding unit 20 and the ground part 30 and of the length and width of the ground part 30 can be obtained through experimentation.

The antenna device 100 operates as a monopole antenna or a PIFA according to fastening of the battery cover 40. Specifically, when the battery cover 40 is not fastened to the lower body 50, only the PCB 60 and the feeding unit 20 are electrically connected, and the antenna device 100 operates as a monopole antenna. When the battery cover 40 is fastened to the lower body 50, the PCB 60 and the feeding unit 20 are electrically connected, the ground part 30 and the battery cover 40 are connected, and the antenna device 100 operates as a PIFA. Further, the antenna device 100 is mounted in a carrier to be mounted to the mobile terminal.

In the present embodiment, the radiation unit 10 of the antenna device 100 is formed as a monopole antenna. However a form of the radiation unit 10 is not limited thereto, and the radiation unit 10 may be formed as a PIFA. In this case, the battery cover 40 extends the ground of the PIFA.

Figure 3B:
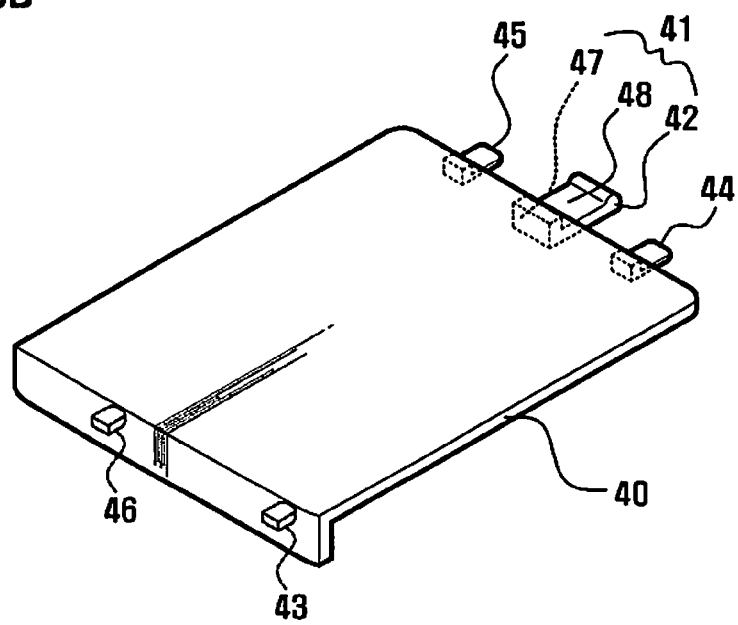
FIG. 3B is a diagram illustrating a perspective view of the battery cover of the mobile terminal of FIG. 2B.

FIG. 3B is a diagram illustrating a perspective view of the battery cover 40 in more detail.

Referring to FIGS. 1 to 3B, the battery cover 40 has a rectangular shape, and the battery cover 40 has the protrusion part 41 for contacting with the ground part 30 when the battery cover 40 is fastened to the lower body 50. The protrusion part 41 has the second projection 42 to be fastened to the ground part 30. Further, the battery cover 40 has the first auxiliary protrusion parts 44 and 45 and second auxiliary protrusion parts 43 and 46 for preventing separation from the lower body 50. It is preferable that the first auxiliary protrusion parts 44 and 45 adjacent to the antenna device 100 are made of a nonmetal material in order to secure radiation performance of the antenna device 100.

Particularly, the battery cover 40, according to the present embodiment, is composed of a metal material, for example, SUS. When the protrusion part 41 formed as the battery cover 40 contacts the ground part 30, the battery cover 40 performs a function as the ground of the antenna device 100. Accordingly, the antenna device 100 operates as a PIFA. When the battery cover 40 is fastened to the lower body 50 of the mobile terminal, the antenna device 100 is changed from a monopole antenna to a PIFA.

When the upper body 70 is composed of a metal material, as the battery cover 40 contacts one side of the upper body 70, and one side of the upper body 70 contacts the ground of the PCB 60, the ground is extended. As the battery cover 40, the upper body 70, and the ground of the PCB 60 are connected, the ground is extended. It is preferable that the second auxiliary protrusion parts 43 and 46 and the upper body 70 are composed of a metal material.

Radiation performance of the antenna device 100 according to an embodiment of the present invention is described using a Smith chart and a frequency spectrum graph.

Figure 4A:
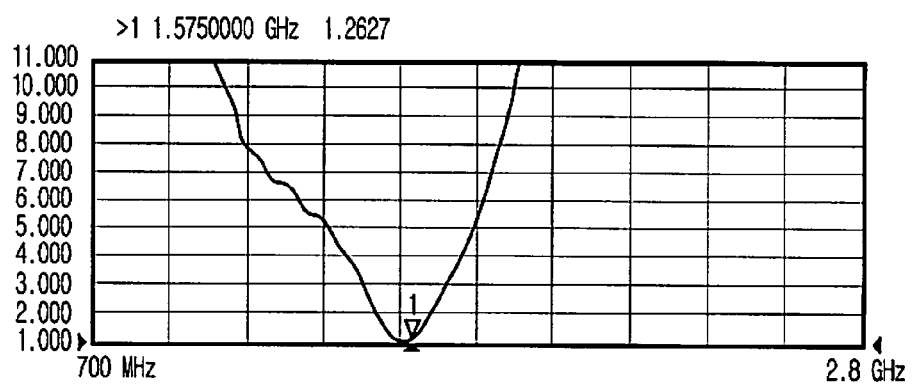
FIG. 4A is a diagram illustrating radiation performance of the antenna device of FIG. 3A when the battery cover is not fastened to the mobile terminal.
Figure 4A:
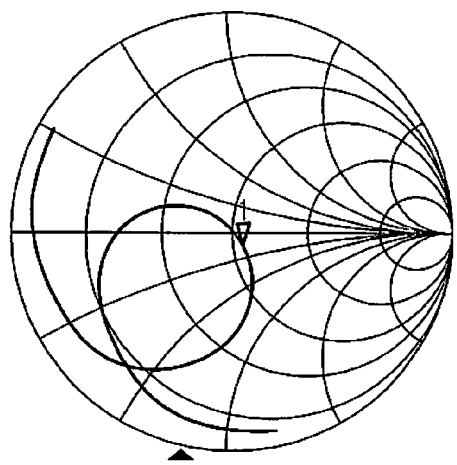
Figure 4B:
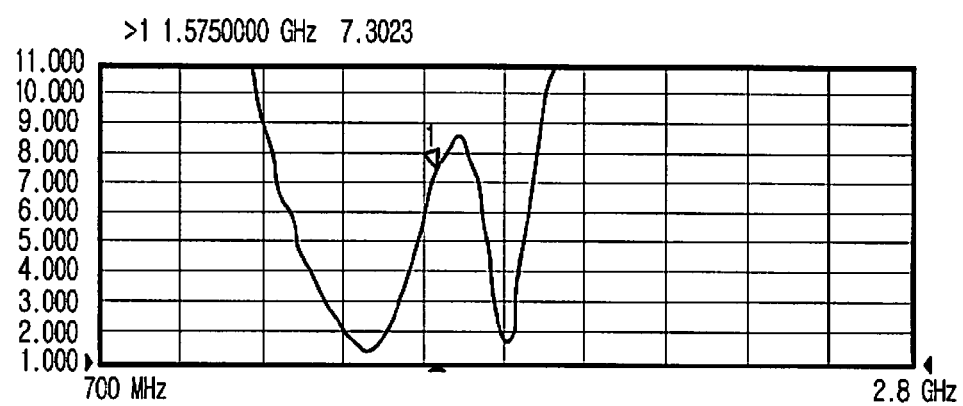
FIG. 4B is a diagram illustrating radiation performance of a conventional antenna device in which a battery cover is fastened to a mobile terminal not in contact with an antenna device.
Figure 4B:
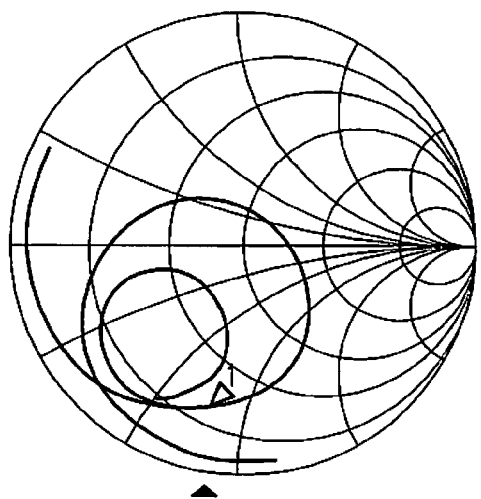
Figure 4C:
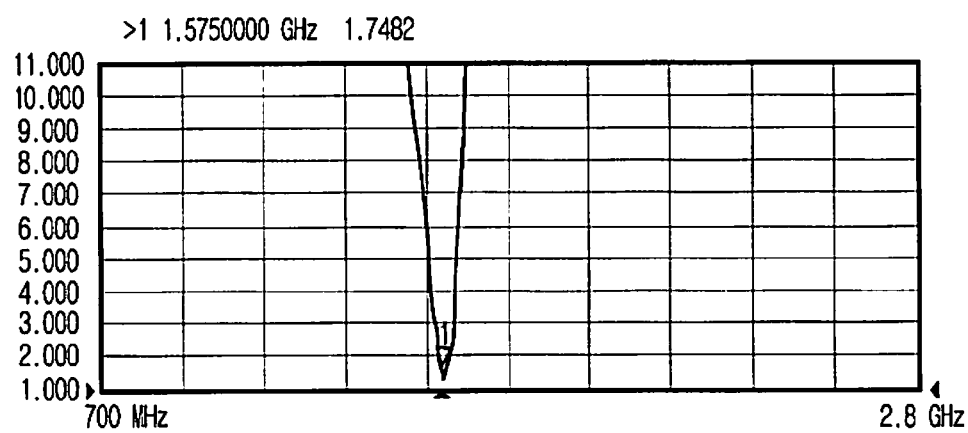
FIG. 4C is a diagram illustrating radiation performance of the antenna device of FIG. 3A when the battery cover is fastened to the mobile terminal in contact with the antenna device.
Figure 4C:
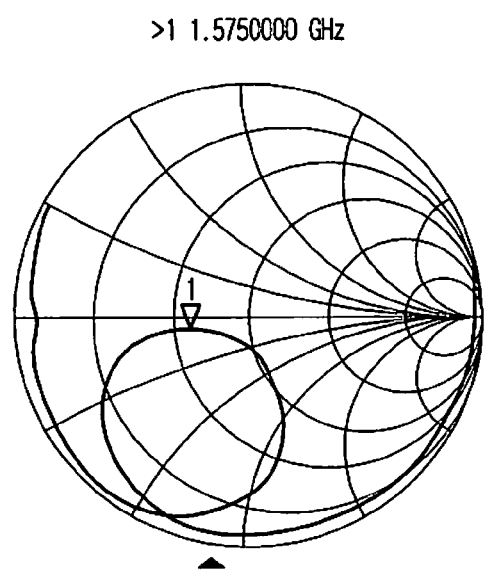

FIG. 4A is a diagram illustrating radiation performance of the antenna device 100 of FIG. 3A when the battery cover 40 composed of a metal material is not fastened to the lower body 50. FIG. 4B is a diagram illustrating radiation performance of a conventional antenna device in which a battery cover composed of a metal material is fastened to a lower body but is not connected to a ground part. FIG. 4C is a diagram illustrating radiation performance of the antenna device 100 of FIG. 3A when the battery cover 40 of the metal material is fastened to the lower body 50 in contact with the ground part 30.

For a better understanding, a Voltage Standing Wave Ratio (VSWR) and a quality factor Q are described.

The VSWR is an index representing a reflection degree of energy input to or output from a circuit or a system, and is a ratio between a minimum value and a maximum value of a voltage standing wave at an input terminal or an output terminal. The VSWR is represented by Equation (1). The voltage standing wave is a stationary wave generated when an advancing wave is added to a reflected wave returning after reflection at the input or output terminal.

$$\text{VSWR} = (1+\text{reflection coefficient})/(1-\text{reflection coefficient}) \quad \text{Equation (1)}$$

In Equation (1), when no reflection exists at an input terminal or an output terminal, the best value of VSWR equals 1, and when a reflection degree is very great, the VSWR approaches infinity. That is, Equation 1 represents that, as the VSWR of an antenna approaches 1, the antenna exhibits good radiation performance.

The quality factor Q is an index representing an energy concentration degree of a waveform in a frequency spectrum and is represented by Equation (2).

$$Q = \text{central frequency}/3 \text{ dB bandwidth} \quad \text{Equation (2)}$$

3 dB bandwidth is a frequency bandwidth between two frequencies 3 dB less than the frequency having maximum energy, i.e. two frequencies each having half of the maximum energy.

In Equation (2), a high quality factor Q represents that energy is concentrated with a resonance frequency. Frequency selectivity for filtering only a desired frequency is good from a frequency filter viewpoint.

The antenna device 100 having the radiation unit 10 designed to have a resonance frequency at 1.575 GHz is exemplified.

Referring to FIG. 4A, when the battery cover 40 is not fastened to the lower body 50, the antenna device 100 operates as a monopole antenna and has a resonance frequency of 1.575 GHz and a VSWR of about 1.26. Referring to FIG. 4B, when the battery cover 40 of a conventional terminal is fastened to the lower body 50 and does not contact with the antenna device 100 thereof, the antenna device generates two resonance frequencies each of at about 1.575 GHz, and a VSWR of about 7.30. That is, the battery cover composed of a metal material adversely affects radiation performance of the antenna device of the conventional mobile terminal.

Referring to FIG. 4C, when a type of the antenna device 100 is changed to a PIFA by contacting the battery cover 40 with the antenna device 100, the antenna device 100 has a resonance frequency of 1.575 GHz and a VSWR of about 1.75. By contacting the battery cover 40 with the antenna device 100, the VSWR increases a little compared to that of the case of FIG. 4A in which the battery cover 40 is not fastened to the mobile terminal, but has no great difference. Referring to FIGS. 4A and 4C, when the antenna device 100 operates as a PIFA, the antenna device 100 has a higher quality factor (hereinafter, Q value). The PIFA in which the battery cover 40 is connected to the ground part 30 has better frequency selectivity. That is, the PIFA can effectively shield an undesired signal. Accordingly, if an antenna device having broadband characteristics is not requested, the antenna device 100 according to embodiments of the present invention can be advantageously used.

Through the foregoing description, although the battery cover 40 composed of a metal material is used, radiation performance of the mobile terminal is not deteriorated by using the antenna device 100 according to the present embodiment. When the antenna device 100, according to this embodiment of the present invention, is applied to a mobile terminal using the battery cover 40 composed of a metal material, radiation performance can be secured, and thus the mobile terminal can be composed of a metal material. The antenna device 100 can be used as an antenna device for mobile communication, GPS, Bluetooth, RFID, and digital broadcasting reception.

The radiation unit 10 of the antenna device 100, according to the present embodiment, is formed as a monopole type antenna, however the radiation unit 10 is not limited thereto. That is, the radiation unit 10 can be formed as a PIFA. In this case, the battery cover 40 composed of a metal material extends the ground of the PIFA. As the battery cover 40 is connected to the upper body 70 and the upper body 70 is connected to the ground of the PCB 60, the ground is extended, however the present invention is not limited thereto. For example, a projection may be formed at an upper end of the battery cover 40 and a part of the ground of the PCB 60 may be exposed, so that when the battery cover 40 is fastened to the lower body 50, the battery cover 40 and the ground of the PCB 60 directly contact, thereby extending the ground. Alternatively, the PCB 60 may extend to a portion of the lower end of the battery cover 40 at which the second auxiliary protrusion parts 43 and 46 are positioned, and thus the second auxiliary protrusion parts 43 and 46 and the ground of the PCB 60 directly contact, thereby extending the ground.

As described above, the antenna device of the mobile terminal, according to embodiments of the present invention, can secure radiation performance in a mobile terminal using a battery cover composed of a metal material. Further, a design limitation of the mobile terminal due to deterioration of radiation performance when using a mobile terminal housing composed of a metal material can be solved.

While the invention has been shown and described with reference to certain preferred embodiments thereof, it will be understood by those skilled in the art that various changes in form and detail may be made therein without departing from the spirit and scope of the invention as defined in the appended claims.

What is claimed is:

1. A mobile communication terminal comprising:
   an outer front side having a display disposed therein;
   an outer rear side comprising:
      a conductive part; and
      a non-conductive part;
   a battery disposed between the outer front side and the outer rear side; and
   an antenna comprising:
      a radiation unit capable of receiving a signal, at least a portion of the radiation unit being disposed between the outer front side and the non-conductive part of the outer rear side;
      a feeding unit which electrically connects the radiation unit to a circuit board; and
      a ground part which:
         is connected to the conductive part of the outer rear side,
         electrically connects the radiation unit to the conductive part of the outer rear side, and
         is separated from the feeding unit by a space.

2. The mobile communication terminal of claim 1, wherein at least a portion of the outer rear side forms a detachable cover for the battery.

3. The mobile communication terminal of claim 1, wherein the ground part of the antenna is mechanically attached to the conductive part of the outer rear side.

4. The mobile communication terminal of claim 1, wherein the ground part of the antenna is detachable from the conductive part of the outer rear side.

5. The mobile communication terminal of claim 1, wherein the ground part of the antenna extends at an angle from a length-wise direction of the radiation unit of the antenna.

6. The mobile communication terminal of claim 1, further comprising:
   a connection module which electrically connects the feeding unit to the circuit board.

7. The mobile communication terminal of claim 6, wherein the connection module is integrally formed with the feeding unit.

8. The mobile communication terminal of claim 1, wherein the antenna comprises an Inverted-F Antenna (IFA).

9. The mobile communication terminal of claim 8, wherein the IFA comprises a Planar Inverted-F Antenna (PIFA).

10. A mobile communication terminal comprising:
    an outer front side having a display disposed therein;
    an outer rear side comprising:
       a metallic part; and
       a non-metallic part;
    a battery disposed between the outer front side and the outer rear side; and
    an Inverted-F Antenna (IFA) comprising:
       a radiation unit capable of receiving a signal, at least a portion of the radiation unit being disposed between the outer front side and the non-metallic part of the outer rear side;
       a feeding unit which electrically connects the radiation unit to a circuit board;
       a ground part which electrically connects the radiation unit to the metallic part of the outer rear side; and
       an extended ground part formed by the metallic part of the outer rear side.

11. The mobile communication terminal of claim 10, wherein at least a portion of the outer rear side forms a detachable cover for the battery.

12. The mobile communication terminal of claim 10, wherein the ground part of the IFA is mechanically attached to the extended ground part.

13. The mobile communication terminal of claim 10, wherein the ground part of the IFA is detachable from the extended ground part.

14. The mobile communication terminal of claim 10, wherein the ground part of the IFA extends at an angle from a length-wise direction of the radiation unit of the IFA.

15. The mobile communication terminal of claim 10, further comprising:
    a connection module which electrically connects the feeding unit to the circuit board.

16. The mobile communication terminal of claim 15, wherein the connection module is integrally formed with the feeding unit.

17. The mobile communication terminal of claim 10, wherein the IFA comprises a Planar Inverted-F Antenna (PIFA).

18. A mobile communication terminal comprising:
    an outer front side having a display disposed therein;
    an outer rear side comprising:
       a conductive part; and
       a non-conductive part;
    a battery disposed between the outer front side and the outer rear side; and
    an antenna comprising:
       a radiation unit capable of receiving a signal, at least a portion of the radiation unit being disposed between the outer front side and the non-conductive part of the outer rear side;
       a feeding unit which passes an electrical signal between the radiation unit and a circuit board; and
       a ground part which:
          is coupled to the conductive part of the outer rear side,
          electrically connects the radiation unit to the conductive part of the outer rear side, and
          is separated from the feeding unit by a space.

19. The mobile communication terminal of claim 18, wherein at least a portion of the outer rear side forms a detachable cover for the battery.

20. The mobile communication terminal of claim 18, wherein the ground part of the antenna is mechanically attached to the conductive part of the outer rear side.

21. The mobile communication terminal of claim 18, wherein the ground part of the antenna is detachable from the conductive part of the outer rear side.

22. The mobile communication terminal of claim 18, wherein the ground part of the antenna extends at an angle from a length-wise direction of the radiation unit of the antenna.

23. The mobile communication terminal of claim 18, further comprising:
   a connection module which electrically connects the feeding unit to the circuit board.

24. The mobile communication terminal of claim 23, wherein the connection module is integrally formed with the feeding unit.

25. The mobile communication terminal of claim 18, wherein the antenna comprises an Inverted-F Antenna (IFA).

26. A mobile communication terminal comprising:
   an outer front side having a display disposed therein;
   an outer rear side comprising:
      a conductive part; and
      a non-conductive part;
   a battery disposed between the outer front side and the outer rear side; and
   an antenna comprising:
      a radiation unit capable of receiving a signal, at least a portion of the radiation unit being disposed under the non-conductive part of the outer rear side;
      a feeding unit which electrically connects the radiation unit to a circuit board; and
      a ground part which:
         is coupled to the conductive part of the outer rear side,
         electrically connects the radiation unit to the conductive part of the outer rear side, and
         is separated from the feeding unit by a space.

27. The mobile communication terminal of claim 26, wherein at least a portion of the outer rear side forms a detachable cover for the battery.

28. The mobile communication terminal of claim 26, wherein the ground part of the antenna is mechanically attached to the conductive part of the outer rear side.

29. The mobile communication terminal of claim 26, wherein the ground part of the antenna is detachable from the conductive part of the outer rear side.

30. The mobile communication terminal of claim 26, wherein the antenna comprises an Inverted-F Antenna (IFA).

* * * * *

UNITED STATES PATENT AND TRADEMARK OFFICE
CERTIFICATE OF CORRECTION

| | | |
|---|---|---|
| PATENT NO. | : 8,878,732 B1 | Page 1 of 1 |
| APPLICATION NO. | : 14/464451 | |
| DATED | : November 4, 2014 | |
| INVENTOR(S) | : Sung et al. | |

It is certified that error appears in the above-identified patent and that said Letters Patent is hereby corrected as shown below:

(75) Inventors: Sang Bong Sung, Gyeongsangbuk-do (KR);
                       In Jin Hwang, Gyeongsangbuk-do (KR)

Should read:
    (75) Inventors: Sang Bong Sung, Gyeongsangbuk-do (KR);
                       In Jin Hwang, Gyeongsangbuk-do (KR);
                       Seung Hwan Kim, Seoul (KR);
                       Jae Ho Lee, Seoul (KR)

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*